United States Patent
Bachner et al.

(10) Patent No.: US 11,303,662 B2
(45) Date of Patent: Apr. 12, 2022

(54) SECURITY INDICATOR SCORES

(71) Applicant: ENTIT Software LLC, Sunnyvale, CA (US)

(72) Inventors: Ofer Bachner, Yehud (IL); Meytal Maor, Yehud (IL); Elad Cohen, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 531 days.

(21) Appl. No.: 15/561,564

(22) PCT Filed: Apr. 20, 2015

(86) PCT No.: PCT/US2015/026585
§ 371 (c)(1),
(2) Date: Sep. 26, 2017

(87) PCT Pub. No.: WO2016/171644
PCT Pub. Date: Oct. 27, 2016

(65) Prior Publication Data
US 2018/0091542 A1   Mar. 29, 2018

(51) Int. Cl.
*H04L 29/06* (2006.01)
(52) U.S. Cl.
CPC .......... *H04L 63/1433* (2013.01); *H04L 63/14* (2013.01); *H04L 63/20* (2013.01)
(58) Field of Classification Search
CPC ..... H04L 63/1433; H04L 63/14; H04L 63/20; G06F 21/577
See application file for complete search history.

(56) References Cited

U.S. PATENT DOCUMENTS

| 8,214,904 B1 | 7/2012 | Doukhvalov et al. |
| 8,683,598 B1 | 3/2014 | Cashin |

(Continued)

FOREIGN PATENT DOCUMENTS

| WO | WO-2012167159 A1 | 12/2012 |
| WO | WO-2014099195 A1 | 6/2014 |
| WO | WO-2015030771 A1 | 3/2015 |

OTHER PUBLICATIONS

Bhagavan, S., "Measuring the Vulnerability Score for Systems Under Attack," (Research Paper), Mar. 27, 2013, 11 pages.

(Continued)

*Primary Examiner* — Taghi T Arani
*Assistant Examiner* — Lin Chang

(57) ABSTRACT

Examples disclosed herein relate to security indicator scores. The examples enable obtaining a security indicator created by a first user where the security indicator may comprise a first observable, and obtaining, from a first source entity, a first sighting of the first observable. The first sighting of the first observable may indicate that the first observable has been observed by the first source entity where the first source entity is associated with a first level of source reliability. The examples enable determining a number of sightings of the first observable. The examples enable determining a first observable score based on the number of sightings of the first observable and the first level of source reliability, and determining an indicator score associated with the security indicator based on the first observable score. The indicator score may be presented to a community of users via a user interface.

15 Claims, 5 Drawing Sheets

(56) References Cited

U.S. PATENT DOCUMENTS

| | | | |
|---|---|---|---|
| 8,832,832 B1* | 9/2014 | Visbal | H04L 63/1408 726/22 |
| 9,118,714 B1* | 8/2015 | Thomson | H04L 63/1433 |
| 2007/0169194 A1 | 7/2007 | Church et al. | |
| 2008/0103962 A1 | 5/2008 | Cohen et al. | |
| 2009/0058710 A1* | 3/2009 | Levitan | G01S 13/87 342/22 |
| 2012/0166636 A1* | 6/2012 | Page | H04L 43/08 709/224 |
| 2013/0191919 A1* | 7/2013 | Basavapatna | H04L 63/1408 726/25 |
| 2013/0290322 A1 | 10/2013 | Prosnitz et al. | |
| 2014/0165174 A1 | 6/2014 | Scipioni et al. | |
| 2015/0128020 A1* | 5/2015 | Chavez | G06F 40/169 715/230 |
| 2015/0143245 A1* | 5/2015 | Waldman | G06F 40/211 715/736 |
| 2015/0220928 A1* | 8/2015 | Allen | G06Q 20/3829 705/67 |
| 2015/0373043 A1* | 12/2015 | Wang | G06F 21/6254 706/12 |
| 2016/0080408 A1* | 3/2016 | Coleman | G06F 21/577 726/22 |
| 2016/0269434 A1* | 9/2016 | DiValentin | H04L 63/1408 |

OTHER PUBLICATIONS

International Searching Authority., International Search Report and Written Opinion dated Jan. 16, 2016 for PCT Application No. PCT/US2015/026585 Filed Apr. 20, 2015, 9 pgs.

* cited by examiner

SECURITY INDICATOR SCORES

BACKGROUND

Users of a security information sharing platform share security indicators, security alerts, and/or other security-related information (e.g., mitigations strategies, attackers, attack campaigns and trends, threat intelligence information, etc.) with other users in an effort to advise the other users of any security threats, or to gain information related to security threats from other users.

BRIEF DESCRIPTION OF THE DRAWINGS

The following detailed description references the drawings, wherein.

DETAILED DESCRIPTION

Figure 1:
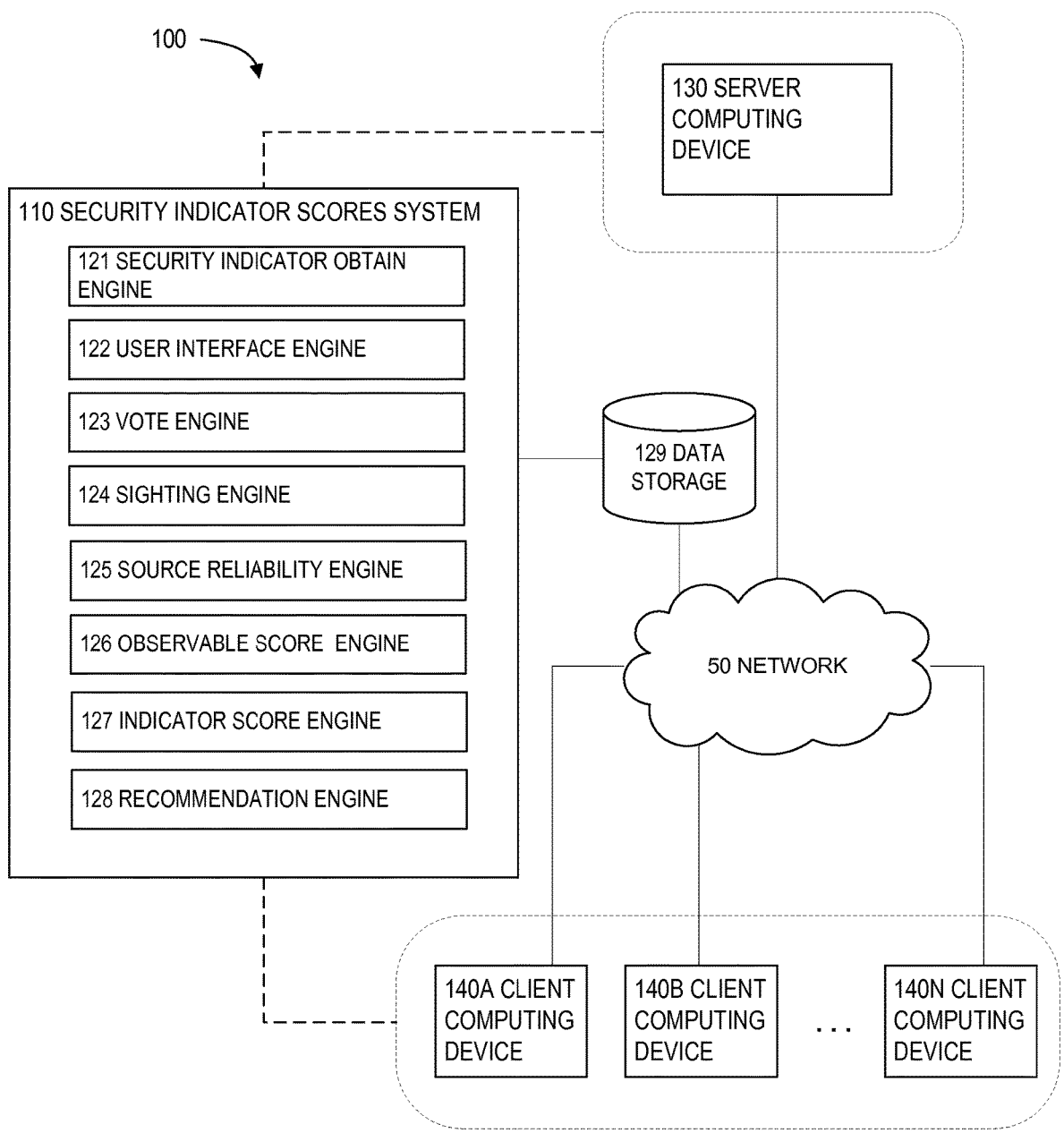
FIG. 1 is a block diagram depicting an example environment in which various examples may be implemented as a security indicator scores system.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Users of a security information sharing platform share security indicators, security alerts, and/or other security-related information (e.g., mitigations strategies, attackers, attack campaigns and trends, threat intelligence information, etc.) with other users in an effort to advise the other users of any security threats, or to gain information related to security threats from other users. The other users with whom the security information is shared typically belong to a community that is selected by the user for sharing, or to the same community as the user. The other users of such communities may further share the security information with further users and/or communities. A "user," as used herein, may include an individual, organization, or any entity that may send, receive, and/or share the security information. A community may include a plurality of users. For example, a community may include a plurality of individuals in a particular area of interest. A community may include a global community where any user may join, for example, via subscription. A community may also be a vertical-based community. For example, a vertical-based community may be a healthcare or a financial community. A community may also be a private community with a limited number of selected users.

A "security indicator," as used herein, may refer to a detection guidance for a security threat and/or vulnerability. In other words, the security indicator may specify what to detect or look for (e.g., an observable) and/or what it means if detected. For example, the security indicator may specify a certain Internet Protocol (IP) address to look for in the network traffic. The security indicator may include the information that the detection of that IP address in the network traffic can indicate a certain malicious security threat such as a Trojan virus. Since security indicators can be easily created and/or added by various users using the security information sharing platform, there may be a risk that a certain security indicator is erroneously classified as malicious that poses an actual security threat. For example, if a popular news site that is actually benign and not malicious is included as an observable in a security indicator, the site can be blocked, causing inconvenience to the users and/or communities. Moreover, this may cause erroneous security alerts to be generated, contaminating the data being shared and continuously being re-shared in the security information sharing environment.

Examples disclosed herein provide technical solutions to these technical challenges by implementing a scoring mechanism to determine an indicator score associated with a security indicator. The examples disclosed herein enable obtaining a security indicator created by a first user where the security indicator may comprise a first observable, and obtaining, from a first source entity, a first sighting of the first observable. The first sighting of the first observable may indicate that the first observable has been observed by the first source entity where the first source entity is associated with a first level of source reliability. The examples enable determining a number of sightings of the first observable. The examples enable determining a first observable score based on the number of sightings of the first observable and the first level of source reliability, and determining an indicator score associated with the security indicator based on the first observable score. The indicator score may be presented to a community of users via a user interface.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

FIG. 1 is an example environment 100 in which various examples may be implemented as a security indicator scores system 110. Environment 100 may include various components including server computing device 130 and client computing devices 140 (illustrated as 140A, 140B, . . . , 140N). Each client computing device 140A, 140B, . . . , 140N may communicate requests to and/or receive responses from server computing device 130. Server computing device 130 may receive and/or respond to requests from client computing devices 140. Client computing devices 140 may be any type of computing device providing a user interface through which a user can interact with a software application. For example, client computing devices 140 may include a laptop computing device, a desktop computing device, an all-in-one computing device, a tablet computing device, a mobile phone, an electronic book reader, a network-enabled appliance such as a "Smart" television, and/or other electronic device suitable for displaying a user interface and processing user interactions with the displayed interface. While server computing device 130 is depicted as a single computing device, server computing device 130 may include any number of integrated or distributed computing devices serving at least one software application for consumption by client computing devices 140.

The various components (e.g., components 129, 130, and/or 140) depicted in FIG. 1 may be coupled to at least one other component via a network 50. Network 50 may comprise any infrastructure or combination of infrastructures that enable electronic communication between the components. For example, network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. According to various implementations, security indicator scores system 110 and the various components described herein may be implemented in hardware and/or a combination of hardware and programming that configures hardware. Furthermore, in FIG. 1 and other Figures described herein, different numbers of components or entities than depicted may be used.

Security indicator scores system 110 may comprise a security indicator obtain engine 121, a user interface engine 122, a vote engine 123, a sighting engine 124, a source reliability engine 125, an observable score engine 126, an indicator score engine 127, a recommendation engine 128, and/or other engines. The term "engine", as used herein, refers to a combination of hardware and programming that performs a designated function. As is illustrated respect to FIGS. 3-4, the hardware of each engine, for example, may include one or both of a processor and a machine-readable storage medium, while the programming is instructions or code stored on the machine-readable storage medium and executable by the processor to perform the designated function.

Security indicator obtain engine 121 may obtain a security indicator created by a user. The security indicator may comprise at least one observable. A "security indicator," as used herein, may refer to a detection guidance for a security threat and/or vulnerability. In other words, the security indicator may specify what to detect or look for (e.g., an observable) and/or what it means if detected. For example, the security indicator may specify a certain Internet Protocol (IP) address to look for in the network traffic. The security indicator may include the information that the detection of that IP address in the network traffic can indicate a certain malicious security threat such as a Trojan virus. An "observable," as used herein, may refer to an event pertinent to the operation of computers and networks (e.g., an event occurring in network, servers, applications, databases, and/or various components of any computer system). Examples of an observable may include but not be limited to: an IP address, a domain name, an e-mail address, Uniform Resource Locator (URL), and a software file hash. A security indicator may comprise a single observable (e.g., "a new file is created by an executable") or a plurality of observables (e.g., "a new file is created by an executable and "the executable connects to domain X").

A security indicator may be created by and/or originated from at least one of a plurality of source entities. For example, the plurality of source entities may include a user. A security indicator may be manually created and/or added to the security information sharing platform by the user. In another example, the plurality of source entities may include a threat intelligence provider that provides threat intelligence feeds. A security indicator that is found in the intelligence feeds, for example, may be created and/or added to the security information sharing platform. There exist a number of providers of threat intelligence feeds, both open source and paid or dosed source. The threat intelligence feeds may be provided by independent third parties such as security service providers. These providers and/or sources may supply the threat intelligence feeds that provide information about threats the providers have identified. Most threat intelligence feeds, for example, include lists of domain names, IP addresses, and URLs that various providers have classified as malicious or at least suspicious according to different methods and criteria.

In some implementations, the user when creating the security indicator may specify a level of confidence associated with the security indicator (e.g., the level of confidence that the indicator is actually malicious) and/or a level of severity (e.g., likely impact) associated with the security indicator (e.g., the level of severity or likely impact that the indicator may pose). Security indicator obtain engine 121 may obtain the security indicator as well as the other information related to the indicator such as the level of confidence and the level of severity from the user.

User interface engine 122 may present, via a user interface, the security indicator created by the user to a community of users. The security indicator once created may be presented, via the user interface (e.g., of the security information sharing platform), to the community of users (e.g., of the security information sharing platform). Any information related to the security indicator may be also presented. As such, any user of the community of users may access the security indicator and/or the information related to the indicator via the user interface. Examples of the information related to the security indicator may include but not be limited to: an indicator score associated with the security indicator (e.g., as discussed herein with respect to indicator score engine 127), votes associated with the security indicator (e.g., as discussed herein with respect to vote engine 123), information related to a source entity of the indicator (e.g., identification of the source entity, level of source reliability associated with the source entity as discussed herein with respect to source reliability engine 125, votes associated with the source entity, etc.), a level of confidence associated with the security indicator (e.g., as discussed herein with respect to security indicator obtain engine 121), a level of severity (e.g., likely impact) associated with the security indicator (e.g., as discussed herein with respect to security indicator obtain engine 121), and information related to an observable in the security indicator (e.g., observable score as discussed herein with respect to observable score engine 126, information related to a source entity that provided the observable, sightings of the observable as discussed herein with respect to sighting engine 124, etc.).

Vote engine 123 may obtain a set of votes associated with the security indicator from the community of users. For example, a first user of the community of users may submit a first vote for the indicator, a second user of the community of users may submit a second vote for the same indicator, and so on. The first vote and the second vote may become part of the set of votes associated with the security indicator. A vote may indicate how confident the user (e.g., who is submitting the vote) is that the security indicator is malicious or not malicious. The vote may be represented in various ways (e.g., yes/no, positive/negative, neutral, a numerical value, etc.). For example, the user may vote for, against, or neutral to the indicator. In another example, the user may submit a numerical value on a scale from a minimum number (e.g., −1) to a maximum number (e.g., +1). The numerical value of "−1" may represent that the user feels confident that the security indicator is not malicious while the numerical value of "+1" may represent that the user feels confident that the indicator is actually malicious. Any value in between may indicate a varying degree of confidence the user has about the security indicator.

In some implementations, vote engine 123 may determine a normalized value of the set of votes using a normalization algorithm. Any normalization algorithm known in the art may be used to determine the normalized value. Assuming that the set of votes represents a set of positive votes (e.g., voted "for" the security indicator), this unbounded input may be normalized into a numerical value between 0-100 (or any other predefined range). This example normalization algorithm defines a bounded logarithmic function to determine the thresholds for each level (e.g., none, low, medium, and high). In this example, if the set of votes (e.g., the total number of votes in the set of votes) is within the "none" level range (e.g., 0 to X−1 range given that X can be a certain integer), the set of votes may be normalized to 0. This means that, when X is 2, the "none" level range may represent 0 to 1. As such, if there has been just one positive vote submitted for a particular security indicator, the normalized value of this set of votes can be 0. If the set of votes is within the "low" level range (e.g., X to $X^2-1$), the set of votes may be normalized to a value between 1-30. If the set of votes is within the "medium" level range (e.g., $X^2$ to $X^3-1$), the set of votes may be normalized to a value between 31-60. If the set of votes is within the "high" level range (e.g., $X^3$ to $X^4-1$), the set of votes may be normalized to a value between 61-100. If the set of votes is above $X^4-1$, the normalized value of this set of votes may be 100. The set of negative votes may be normalized in a similar way. In some instances, the set negative votes may be normalized in such a way that the negative votes have a higher influence on an indicator score of the security indicator than the influence that the positive set of votes may have on the indicator score.

Sighting engine 124 may obtain, from a source entity, a sighting of an observable. The sighting of the observable may indicate that the observable has been observed by the source entity. For example, the source entity (e.g., the examples of the source entity are discussed herein with respect to security indicator obtain engine 121) may detect a certain IP address (e.g., the observable) in its network traffic, and add the observable to the security information sharing platform. This addition of the observable may be considered as a single sighting of the observable. In some instances, when two individuals working for the same organization add the same observable to the platform, sighting engine 124 may treat these additions as a single sighting of the observable or as two separate sightings of the observable. In another example, when the IP address (e.g., the observable) is found in the threat intelligence feeds provided a particular threat intelligence provider, this observable may be added to the security information sharing platform as a single sighting of this observable. When two different set of threat intelligence feeds provided by two different providers include the same observable, the observable may be added as two sightings of the observable.

Sighting engine 124 may determine a number (e.g., count) of sightings of the observable. For example, sighting engine 124 may obtain, from a first source entity, a first sighting of the observable that indicates that the observable has been observed by the first source entity. Sighting engine 124 may obtain, from a second source entity, a second sighting of the observable that indicates that the observable has been observed by the second source entity. In this case, the number of sightings of this observable may be 2. Note that the same observable may be associated with more than one security indicators. For example, a certain IP address may be part of a first security indicator (e.g., a finding of this IP address indicates a Trojan virus) as well as a second security indicator (e.g., a finding of this IP address visiting a particular URL indicates a Trojan virus). As such, a single sighting of the observable may be counted as one sighting for each of the first security indicator and the second security indicator. Therefore, a single sighting of the observable associated with more than one security indicators can influence the respective indicator scores associated with those security indicators. In some implementations, sighting engine 124 may determine a normalized value of the number of sightings using a normalization algorithm (e.g., a normalization algorithm that is similar to the example normalization algorithm as discussed herein with respect to vote engine 123). Any normalization algorithm known in the art may be used to determine the normalized value.

Source reliability engine 125 may identify and/or determine a level of source reliability associated with a particular source entity (e.g., individual user, organization, threat intelligence provider, etc.). The source reliability of a particular user may be determined based on at least one of the parameters including the user's past activity (e.g., a number of security indicators created by the user in the past or in the last predetermined number of days, a number of votes made by the user in the past or in the last predetermined number of days, a frequency of log-ins to the security information sharing platform by the user), the votes made to the security indicators created by the user (e.g., the number of positive, neutral, and/or negative votes made to the security indicators, etc.), the user's expertise (e.g., area of expertise, level of expertise, etc.), the user's organization, the user's geographic location, the user's connection or relationship with other users, and/or other parameters related to the user. For example, source reliability engine 125 may determine a set of security indicators created by the user and/or determine a number of votes associated with the set of security indicators. If the user has created 2 security indicators in the past with the one indicator with 3 positive votes and the other indicator with 5 positive votes, the number of positive votes made to the security indicators created by the user may be 8. This number may be used as one of the parameters for determining the level of source reliability associated with this user. The source reliability of a particular threat intelligence provider may be determined based on user input (e.g., by a system administrator).

Observable score engine 126 may determine an observable score associated with an observable based on at least one of the parameters including the number of sightings (or the normalized value thereof) of the observable (e.g., as discussed herein with respect to sighting engine 124) and the level of source reliability associated with a source entity from which a sighting of the observable is obtained (e.g., as discussed herein with respect to source reliability engine 125). In one example, the observable score may be (0.7*the normalized value of the number of sightings of the observable)±(0.3*reliability of the observable). For example, there may be 3 sightings of a particular observable where a first sighting has been reported by a first source entity (e.g., associated with a first level of source reliability), a second sighting has been reported by a second source entity (e.g., associated with a second level of source reliability), and a third sighting has been reported by a third source entity (e.g., associated with a third level of source reliability). Three sightings may be normalized to a numerical value of 75 which may be in the "medium" level range. Further, the level of source reliability for each of the three source entities may be determined and/or obtained (e.g., by source reliability engine 125 as discussed herein), which include the first level of source reliability, the second level of source reliability, and the third level of source reliability in this example.

The reliability of the observable may be a maximum value, a minimum value, an average value, a median value, or other aggregated value of the three levels of source reliability (e.g., the first, second, and third levels of source reliability). For example, if the first, second, and third levels of reliability indicate 70, 50, and 20, respectively, the reliability of the observable may be the maximum value of these three, that is 70. Using the example equation above, the observable score may be (0.7*75)+(0.3*70)=73.5.

Indicator score engine 127 may determine an indicator score associated with the security indicator based on at least one of the parameters including the set of votes associated with the security indicator (or the normalized value of the set of votes) (e.g., as discussed herein with respect to vote engine 123), an observable score of at least one observable included in the security indicator (e.g., as discussed herein with respect to observable score engine 126), the level of severity associated with the security indicator, the level of confidence associated with the security indicator, the level of source reliability associated with the source entity which created the security indicator (e.g., as discussed herein with respect to source reliability engine 125), and/or other parameters. Each of the parameters may be scaled by a corresponding weight. The weight may represent the weight or influence the particular parameter has on the indicator score. For example, the weight value may be any value from 0 to 100. The total sum of all weights of the parameters being used to determine the indicator score can be 100 in some situations, but is not necessarily 100.

In some implementations, the security indicator may include more than one observable (e.g., a first observable and a second observable). In this case, indicator score engine 127 may obtain a first observable score associated with the first observable and a second observable score associated with the second observable as determined by observable score engine 126 above. Indicator score engine 127 may determine a maximum value, a minimum value, an average value, a median value, or other aggregated value of the first and second observable scores, which may be used as one of the parameters to determine the indicator score.

Recommendation engine 128 may generate a recommendation and/or a recommended action based on the indicator score (e.g., as discussed herein with respect to indicator score engine 127) of the security indicator. For example, if the indicator score is below a first threshold value, the indicator can be continued to be monitored without any further action. If the indicator score is above the first threshold value but below a second threshold value, the recommendation may be generated to inform at least one user to perform a further investigation on the security indicator. If the indicator score is above a third threshold value, the indicator may be considered to be malicious that could pose an actual security threat. In this case, any event that matches this security indicator may be blocked from accessing certain resources.

In performing their respective functions, engines 121-128 may access data storage 129 and/or other suitable database(s). Data storage 129 may represent any memory accessible to security indicator scores system 110 that can be used to store and retrieve data. Data storage 129 and/or other database may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. Security indicator scores system 110 may access data storage 129 locally or remotely via network 50 or other networks.

Data storage 129 may include a database to organize and store data. The database may reside in a single or multiple physical device(s) and in a single or multiple physical location(s). The database may store a plurality of types of data and/or files and associated data or file description, administrative information, or any other data.

Figure 2:
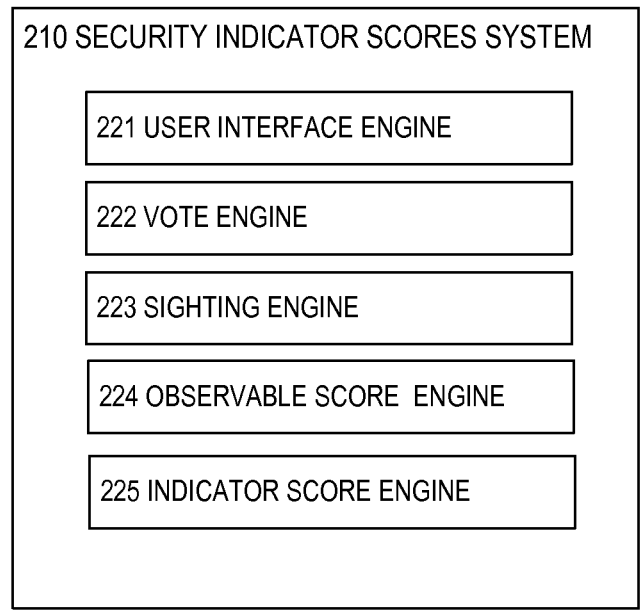
FIG. 2 is a block diagram depicting an example security indicator scores system.

FIG. 2 is a block diagram depicting an example security indicator scores system 210. Security indicator scores system 210 may comprise a user interface engine 221, a vote engine 222, a sighting engine 223, an observable score engine 224, an indicator score engine 225, and/or other engines. Engines 221-225 represent engines 122-124, 126, and 127, respectively.

Figure 3:
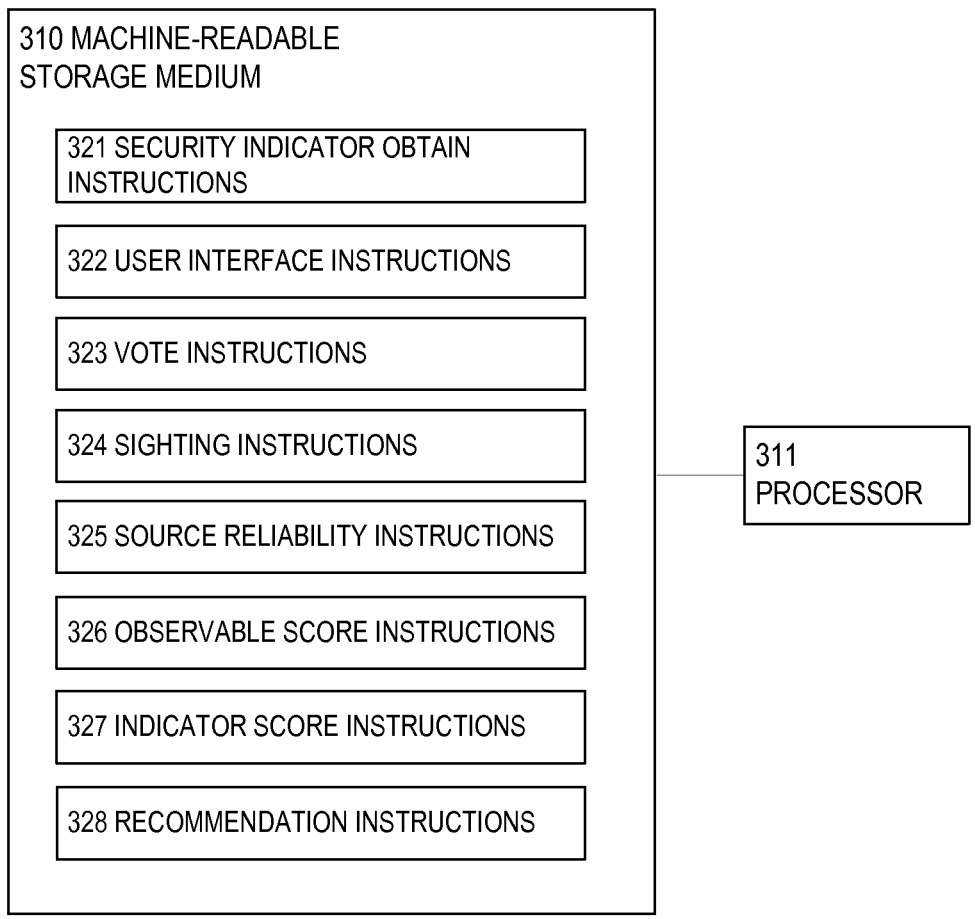
FIG. 3 is a block diagram depicting an example machine-readable storage medium comprising instructions executable by a processor for determining security indicator scores.

FIG. 3 is a block diagram depicting an example machine-readable storage medium 310 comprising instructions executable by a processor for determining security indicator scores.

In the foregoing discussion, engines 121-128 were described as combinations of hardware and programming. Engines 121-128 may be implemented in a number of fashions. Referring to FIG. 3, the programming may be processor executable instructions 321-328 stored on a machine-readable storage medium 310 and the hardware may include a processor 311 for executing those instructions. Thus, machine-readable storage medium 310 can be said to store program instructions or code that when executed by processor 311 implements security indicator scores system 110 of FIG. 1.

In FIG. 3, the executable program instructions in machine-readable storage medium 310 are depicted as security indicator obtain instructions 321, user interface instructions 322, vote instructions 323, sighting instructions 324, source reliability instructions 325, observable score instructions 326, indicator score instructions 327, and recommendation instructions 328. Instructions 321-328 represent program instructions that, when executed, cause processor 311 to implement engines 121-128, respectively.

Figure 4:
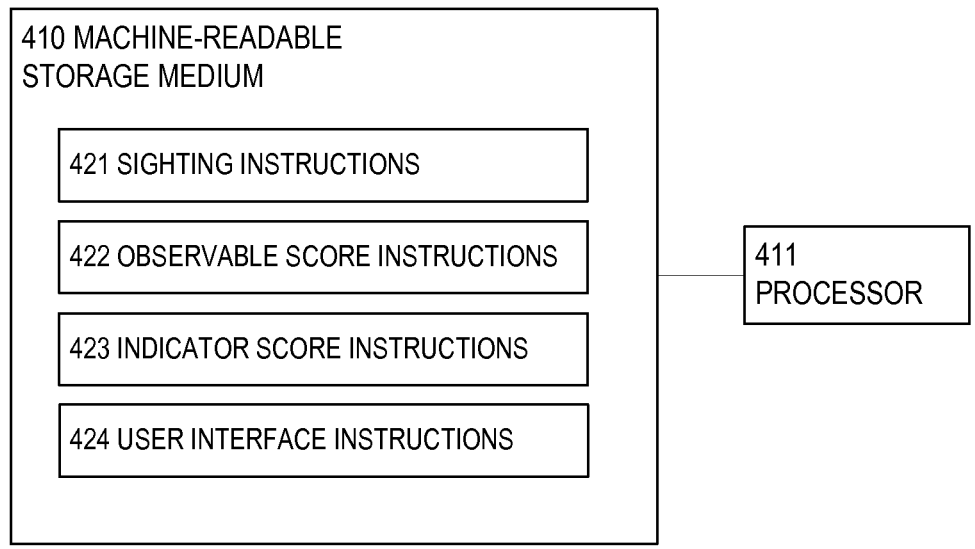
FIG. 4 is a block diagram depicting an example machine-readable storage medium comprising instructions executable by a processor for determining security indicator scores.

FIG. 4 is a block diagram depicting an example machine-readable storage medium 410 comprising instructions executable by a processor for determining security indicator scores.

In the foregoing discussion, engines 121-128 were described as combinations of hardware and programming. Engines 121-128 may be implemented in a number of fashions. Referring to FIG. 4, the programming may be processor executable instructions 421-424 stored on a machine-readable storage medium 410 and the hardware may include a processor 411 for executing those instructions. Thus, machine-readable storage medium 410 can be said to store program instructions or code that when executed by processor 411 implements security indicator scores system 110 of FIG. 1.

In FIG. 4, the executable program instructions in machine-readable storage medium 410 are depicted as sighting instructions 421, observable score instructions 422, indicator score instructions 423, and user interface instructions 424. Instructions 421-424 represent program instructions that, when executed, cause processor 411 to implement engines 124, 126, 127, and 122, respectively.

Machine-readable storage medium 310 (or machine-readable storage medium 410) may be any electronic, magnetic, optical, or other physical storage device that contains or stores executable instructions. In some implementations, machine-readable storage medium 310 (or machine-readable storage medium 410) may be a non-transitory storage medium, where the term "non-transitory" does not encompass transitory propagating signals. Machine-readable storage medium 310 (or machine-readable storage medium 410) may be implemented in a single device or distributed across devices. Likewise, processor 311 (or processor 411) may represent any number of processors capable of executing instructions stored by machine-readable storage medium 310 (or machine-readable storage medium 410). Processor 311 (or processor 411) may be integrated in a single device or distributed across devices. Further, machine-readable storage medium 310 (or machine-readable storage medium 410) may be fully or partially integrated in the same device as processor 311 (or processor 411), or it may be separate but accessible to that device and processor 311 (or processor 411).

In one example, the program instructions may be part of an installation package that when installed can be executed by processor 311 (or processor 411) to implement security indicator scores system 110. In this case, machine-readable storage medium 310 (or machine-readable storage medium 410) may be a portable medium such as a floppy disk, CD, DVD, or flash drive or a memory maintained by a server from which the installation package can be downloaded and installed. In another example, the program instructions may be part of an application or applications already installed. Here, machine-readable storage medium 310 (or machine-readable storage medium 410) may include a hard disk, optical disk, tapes, solid state drives, RAM, ROM, EEPROM, or the like.

Processor 311 may be at least one central processing unit (CPU), microprocessor, and/or other hardware device suitable for retrieval and execution of instructions stored in machine-readable storage medium 310. Processor 311 may fetch, decode, and execute program instructions 321-327, and/or other instructions. As an alternative or in addition to retrieving and executing instructions, processor 311 may include at least one electronic circuit comprising a number of electronic components for performing the functionality of at least one of instructions 321-327, and/or other instructions.

Processor 411 may be at least one central processing unit (CPU), microprocessor, and/or other hardware device suitable for retrieval and execution of instructions stored in machine-readable storage medium 410. Processor 411 may fetch, decode, and execute program instructions 421-424, and/or other instructions. As an alternative or in addition to retrieving and executing instructions, processor 411 may include at least one electronic circuit comprising a number of electronic components for performing the functionality of at least one of instructions 421-424, and/or other instructions.

Figure 5:
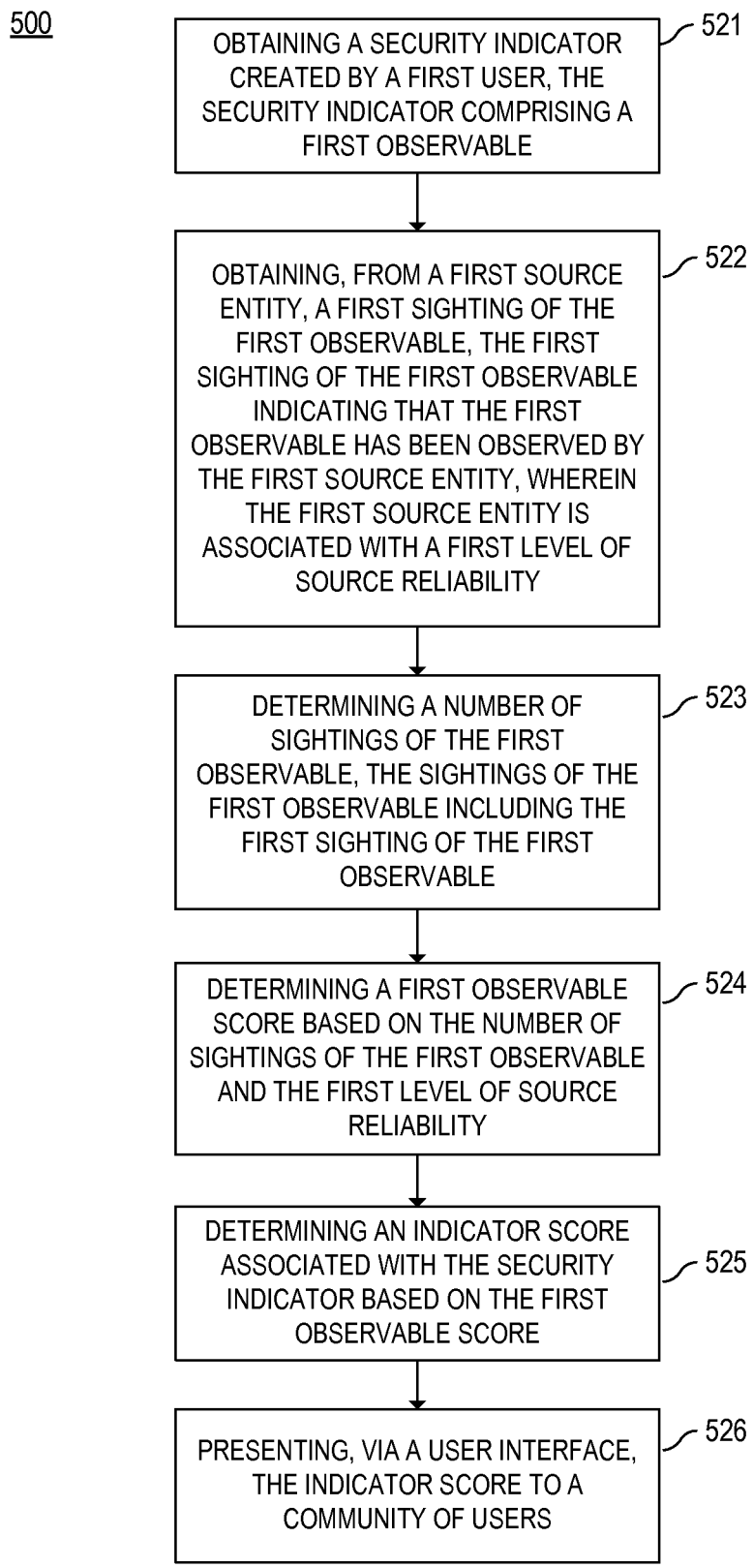
FIG. 5 is a flow diagram depicting an example method for determining security indicator scores.

FIG. 5 is a flow diagram depicting an example method 500 for determining security indicator scores. The various processing blocks and/or data flows depicted in FIG. 5 (and in the other drawing figures such as FIG. 6) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 500 as illustrated (and described in greater detail below) is meant be an example and, as such, should not be viewed as limiting. Method 500 may be implemented in the form of executable instructions stored on a machine-readable storage medium, such as storage medium 310, and/or in the form of electronic circuitry.

In block 521, method 500 may include obtaining a security indicator created by a first user. The security indicator may comprise a first observable. Examples of an observable may include but not be limited to: an IP address, a domain name, an e-mail address, Uniform Resource Locator (URL), and a software file hash. A security indicator may be created by and/or originated from at least one of a plurality of source entities (e.g., an individual user, an organization, threat intelligence provider, etc.).

In block 522, method 500 may include obtaining, from a first source entity, a first sighting of the first observable. The first sighting of the first observable may indicate that the first observable has been observed by the first source entity. For example, the first source entity may detect a certain IP address (e.g., the first observable) in its network traffic, and add the first observable to the security information sharing platform. This addition of the first observable may be considered as a single sighting of the first observable.

The first source entity may be associated with a first level of source reliability. For example, the source reliability of a particular user may be determined based on at least one of the parameters including the user's past activity (e.g., a number of security indicators created by the user in the past or in the last predetermined number of days, a number of votes made by the user in the past or in the last predetermined number of days, a frequency of log-ins to the security information sharing platform by the user), the votes made to the security indicators created by the user (e.g., the number of positive, neutral, and/or negative votes made to the security indicators, etc.), the user's expertise (e.g., area of expertise, level of expertise, etc.), the user's organization, the user's geographic location, the user's connection or relationship with other users, and/or other parameters related to the user. In another example, the source reliability of a particular threat intelligence provider may be determined based on user input (e.g., by a system administrator).

In block 523, method 500 may include determining a number (e.g., count) of sightings of the first observable. For example, method 500 may further obtain, from a second source entity, a second sighting of the first observable that indicates that the first observable has been observed by the second source entity. In this case, the number of sightings of the first observable may be 2. In some implementations, method 500 may determine a normalized value of the number of sightings using a normalization algorithm (e.g., a normalization algorithm that is similar to the example normalization algorithm as discussed herein with respect to vote engine 123).

In block 524, method 500 may include determining a first observable score based on the number of sightings (or the normalized value thereof) of the first observable (e.g., as discussed herein with respect to sighting engine 124) and the level of source reliability associated with a source entity from which a sighting of the first observable is obtained (e.g., as discussed herein with respect to source reliability engine 125). In one example, the first observable score may be (0.7*the normalized value of the number of sightings of the first observable)±(0.3*reliability of the first observable). For example, there may be 3 sightings of the first observable where the first sighting has been reported by the first source entity (e.g., associated with the first level of source reliability), a second sighting has been reported by a second source entity (e.g., associated with a second level of source reliability), and a third sighting has been reported by a third source entity (e.g., associated with a third level of source reliability). Three sightings may be normalized to a numerical value of 75 which may be in the "medium" level range. Further, the level of source reliability for each of the three source entities may be determined and/or obtained (e.g., by source reliability engine 125 as discussed herein), which include the first level of source reliability, the second level of source reliability, and the third level of source reliability in this example.

The reliability of the first observable may be a maximum value, a minimum value, an average value, a median value, or other aggregated value of the three levels of source reliability (e.g., the first, second, and third levels of source reliability). For example, if the first, second, and third levels of reliability indicate 70, 50, and 20, respectively, the reliability of the first observable may be the maximum value of these three, that is 70. Using the example equation above, the observable score may be (0.7*75)+(0.3*70)=73.5.

In block 525, method 500 may include determining an indicator score associated with the security indicator based on the first observable score. In some implementations, the security indicator may include more than one observable (e.g., the first observable and a second observable). In this case, method 500 may obtain the first observable score associated with the first observable and a second observable score associated with the second observable. Method 500 may determine a maximum value, a minimum value, an average value, a median value, or other aggregated value of the first and second observable scores, which may be used as one of the parameters to determine the indicator score. Other parameters used to determine the indicator score may include the set of votes associated with the security indicator (or the normalized value of the set of votes) (e.g., as discussed herein with respect to vote engine 123), the level of severity associated with the security indicator, the level of confidence associated with the security indicator, the level of source reliability associated with the source entity which created the security indicator (e.g., as discussed herein with respect to source reliability engine 125), and/or other parameters. Each of the parameters may be scaled by a corresponding weight. The weight may represent the weight or influence the particular parameter has on the indicator score. For example, the weight value may be any value from 0 to 100.

In block 526, method 500 may include presenting, via a user interface, the indicator score to a community of users (e.g., of the security information sharing platform).

Referring back to FIG. 1, security indicator obtain engine 121 may be responsible for implementing block 521. Sighting engine 124 may be responsible for implementing blocks 522 and 523. Observable score engine 126 may be responsible for implementing block 524. Indicator score engine 127 may be responsible for implementing block 525. User interface engine 122 may be responsible for implementing 526.

Figure 6:
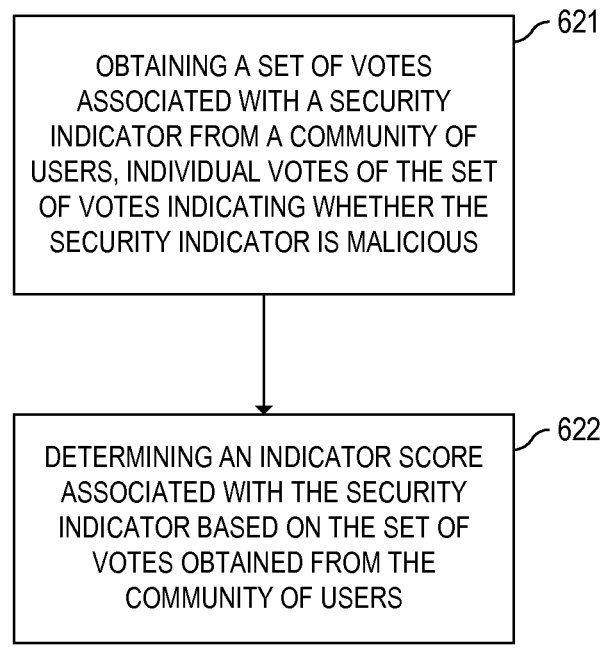
FIG. 6 is a flow diagram depicting an example method for determining security indicator scores.

FIG. 6 is a flow diagram depicting an example method 600 for determining security indicator scores. Method 600 as illustrated (and described in greater detail below) is meant to be an example and, as such, should not be viewed as limiting. Method 600 may be implemented in the form of executable instructions stored on a machine-readable storage medium, such as storage medium 210, and/or in the form of electronic circuitry.

In block 621, method 600 may include obtaining a set of votes associated with a security indicator from a community of users (e.g., of the security information sharing platform). For example, a first user of the community of users may submit a first vote for the indicator, a second user of the community of users may submit a second vote for the same indicator, and so on. The first vote and the second vote may become part of the set of votes associated with the security indicator. A vote may indicate how confident the user (e.g., who is submitting the vote) is that the security indicator is malicious or not malicious. The vote may be represented in various ways (e.g., yes/no, positive/negative, neutral, a numerical value, etc.). For example, the user may vote for, against, or neutral to the indicator. In another example, the user may submit a numerical value on a scale from a minimum number (e.g., −1) to a maximum number (e.g., +1). The numerical value of "−1" may represent that the user feels confident that the security indicator is not malicious while the numerical value of "+1" may represent that the user feels confident that the indicator is actually malicious. Any value in between may indicate a varying degree of confidence the user has about the security indicator. In some implementations, method 500 may determine a normalized value of the set of votes using a normalization algorithm. Any normalization algorithm known in the art may be used to determine the normalized value.

In block 622, method 600 may include determining an indicator score associated with the security indicator based on the set of votes obtained from the community of users (or the normalized value thereof). Other parameter used to determine the indicator score may include an observable score of at least one observable included in the security indicator (e.g., as discussed herein with respect to observable score engine 126), the level of severity associated with the security indicator, the level of confidence associated with the security indicator, the level of source reliability associated with the source entity which created the security indicator (e.g., as discussed herein with respect to source reliability engine 125), and/or other parameters. Each of the parameters may be scaled by a corresponding weight. The weight may represent the weight or influence the particular parameter has on the indicator score. For example, the weight value may be any value from 0 to 100.

Referring back to FIG. 1, vote engine 123 may be responsible for implementing 621. Indicator score engine 127 may be responsible for implementing block 622.

The foregoing disclosure describes a number of example implementations for security indicator scores. The disclosed examples may include systems, devices, computer-readable storage media, and methods for security indicator scores. For purposes of explanation, certain examples are described with reference to the components illustrated in FIGS. 1-4. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 5-6 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method for determining security indicator scores, the method comprising:
   obtaining a security indicator created by a first user, the security indicator comprising a first observable and containing information identifying a security threat and associating the first observable with the identified security threat;
   obtaining, from a first source entity, a first sighting of the first observable, the first sighting of the first observable indicating that the first observable has been observed by the first source entity, wherein the first source entity is associated with a first level of source reliability;
   determining, by a processor, a number of sightings of the first observable, the sightings of the first observable including the first sighting of the first observable;
   determining, by the processor, a first observable score based on the number of sightings of the first observable and the first level of source reliability;
   obtaining, by the processor, a set of votes associated with the security indicator from a community of users, individual votes of the set of votes indicating whether the security indicator is malicious;
   determining, by the processor, an indicator score associated with the security indicator based on the set of votes obtained from the community of users and the first observable score; and
   presenting, via a user interface, the indicator score to the community of users.

2. The method of claim 1, further comprising:
   obtaining, from a second source entity, a second sighting of the first observable, the second sighting of the first observable indicating that the first observable has been observed by the second source entity, the second source entity is associated with a second level of source reliability;
   determining the number of sightings of the first observable, the sightings of the first observable including the first and second sightings of the first observable; and
   determining the first observable score based on the number of sightings of the first observable and the first and second levels of source reliability.

3. The method of claim 1, wherein the security indicator comprises a second observable, further comprising:
   obtaining, from the first source entity, a first sighting of the second observable, the first sighting of the second observable indicating that the second observable has observed by the first source entity;
   determining the number of sightings of the second observable, the sightings of the second observable including the first sighting of the second observable; and
   determining a second observable score based on the number of sightings of the second observable and the first level of source reliability.

4. The method of claim 3, further comprising:
   determining the indicator score associated with the security indicator further based on a maximum of the first and second observable scores.

5. The method of claim 1, wherein the first source entity is a second user, further comprising:
   determining the first level of source reliability based on a number of security indicators created by the second user.

6. The method of claim 1, further comprising:
   determining the indicator score associated with the security indicator further based on at least one of: a level of severity associated with the security indicator, a level of confidence associated with the security indicator, and a third level of source reliability associated with the first user, wherein the level of severity and the level of confidence are provided by the first user.

7. A non-transitory machine-readable storage medium storing instructions that when executed by a processor of a computing device cause the processor to:
   obtain, from a first source entity, a first sighting of a first observable that is associated with a first security indicator, the first sighting of the first observable indicating that the first observable has been observed by the first source entity, wherein the first source entity is associated with a first level of source reliability, and the first security indicator comprising information identifying a security threat and associating the first observable with the identified security threat;
   determine a number of sightings of the first observable, the sightings of the first observable including the first sighting of the first observable;
   determine a first observable score based on the number of sightings of the first observable and the first level of source reliability;
   present, via a user interface, the first security indicator to a community of users;
   obtain a set of votes associated with the first security indicator from the community of users, individual votes of the set of votes indicating whether the first security indicator is malicious;
   determine a first indicator score associated with the first security indicator based on the set of votes obtained from the community of users and the first observable score; and
   present, via the user interface, the first indicator score to the community of users.

8. The non-transitory machine-readable storage medium of claim 7, wherein the instructions further cause the processor to:
  obtain, from a second source entity, a second sighting of the first observable, the second sighting of the first observable indicating that the first observable has been observed by the second source entity, wherein the second source entity is associated with a second level of source reliability;
  determine the number of sightings of the first observable, the sightings of the first observable including the first and second sightings of the first observable; and
  determine the first observable score based on the number of sightings of the first observable and a maximum of the first and second levels of source reliability.

9. The non-transitory machine-readable storage medium of claim 7, wherein the instructions further cause the processor to:
  determine a set of security indicators created by a particular user, the set of security indicators including at least the first security indicator,
  determine a number of votes associated with the set of security indicators;
  determine a third level of source reliability associated with the particular user based on the number of votes; and
  determine the first indicator score associated with the first security indicator further based on the third level of source reliability.

10. The non-transitory machine-readable storage medium of claim 7, wherein the first source entity comprises a user of the community of users or a threat intelligence provider that provides threat intelligence feeds.

11. A system comprising:
  a processor, and
  a memory storing instructions that, when executed by the processor, cause the processor to:
    present, via a user interface, a security indicator created by a user to a community of users, the security indicator comprising an observable, wherein the security indicator comprises information identifying a security threat and associating the observable with the identified security threat;
    obtain a set of votes associated with the security indicator from the community of users, individual votes of the set of votes indicating whether the security indicator is malicious;
    obtain, from a source entity, a sighting of the observable, the sighting of the observable indicating that the observable has been observed by the source entity, wherein the source entity is associated with a level of source reliability;
    determine an observable score based on a plurality of sightings of the observable and the level of source reliability, wherein the plurality of sightings comprise the sighting of the observable obtained from the source entity; and
    determine an indicator score associated with the security indicator based on the set of votes obtained from the community of users and the observable score.

12. The system of claim 11, wherein the instructions, when executed by the processor, further cause the processor to:
  determine a normalized value of the set of votes using a normalization algorithm.

13. The system of claim 11, wherein the instructions, when executed by the processor, further cause the processor to:
  determine whether to block an event that matches the security indicator based on the indicator score.

14. The method of claim 1, further comprising:
  determining a normalized value of the set of votes using a normalization algorithm.

15. The method of claim 1, further comprising:
  determining whether to block an event that matches the security indicator based on the indicator score.

* * * * *